United States Patent Office.

ANN LOOSLEY, OF PHILADELPHIA, PENNSYLVANIA.

Letters Patent No. 62,650, dated March 5, 1867.

IMPROVED MEDICINE.

*The Schedule referred to in these Letters Patent and making part of the same.*

TO ALL WHOM IT MAY CONCERN:

Be it known that I, ANN LOOSLEY, of Philadelphia, in the county of Philadelphia, and State of Pennsylvania, have invented a new Composition of Matter or Medicine for the Cure of Whooping-Cough, which I assert to be an infallible remedy for that distressing disease; and I do hereby declare that the following is a full and exact description thereof.

The nature of my invention consists in the preparation of a composition of matter or medicine for the cure of whooping-cough, composed of the following ingredients, viz, West India sirup, pulverized rosin, and tincture of wild cherry bark, in the following proportions: Three teaspoonfuls of West India sirup, one teaspoonful of pulverized rosin, and ten drops of tincture of wild cherry bark, to be thoroughly mixed together. Dose—one teaspoonful immediately after every fit of coughing.

Said West India sirup being also known as West India molasses, made from sugar cane, and of which it is a better quality, and which can be procured in Philadelphia, and I presume elsewhere, at any respectable grocery.

What I claim as my invention, and desire to procure by Letters Patent, is—

The combination of the said ingredients in the said proportions, thereby producing the said medicine, and which I propose to manufacture and sell as "Loosley's Infallible Cure for Whooping-Cough."

ANN LOOSLEY.

Witnesses:
J. P. DELANY,
PHILIP J. TAYLOR.